(12) United States Patent
De Groot et al.

(10) Patent No.: US 6,439,445 B1
(45) Date of Patent: Aug. 27, 2002

(54) TENSIONER

(75) Inventors: Anne Klaas De Groot, Odijk; Piet Kalkman, Waddinxveen, both of (NL)

(73) Assignee: Itrec B.V., Ad Schiedam (NL)

( * ) Notice: Subject to any disclaimer, the term of this patent is extended or adjusted under 35 U.S.C. 154(b) by 0 days.

(21) Appl. No.: 09/423,368

(22) PCT Filed: May 4, 1998

(86) PCT No.: PCT/NL98/00245

§ 371 (c)(1),
(2), (4) Date: Dec. 30, 1999

(87) PCT Pub. No.: WO98/50719

PCT Pub. Date: Nov. 12, 1998

(30) Foreign Application Priority Data

May 6, 1997 (NL) ............................................. 1005992

(51) Int. Cl.[7] ........................... F16L 1/12; B65H 20/00; B65H 23/08
(52) U.S. Cl. ..................... 226/172; 226/176; 226/190; 226/195; 405/168.4
(58) Field of Search ............................... 226/172, 173, 226/176, 190, 195; 405/168.3, 168.4

(56) References Cited

U.S. PATENT DOCUMENTS

| | | | |
|---|---|---|---|
| 3,022,928 A | * | 2/1962 | Ulmitz ....................... 226/172 |
| 3,473,715 A | | 10/1969 | Shuey, Jr. |
| 3,612,374 A | * | 10/1971 | Shartzer ..................... 226/172 |
| 3,680,342 A | * | 8/1972 | Mott et al. ............... 226/172 X |
| 3,739,971 A | * | 6/1973 | Silvestri et al. ............. 226/172 |
| 4,269,540 A | * | 5/1981 | Uyeda et al. ........... 226/172 X |
| 4,508,251 A | * | 4/1985 | Harada et al. .......... 226/172 X |
| 4,828,223 A | * | 5/1989 | Russell et al. .......... 226/172 X |
| 5,533,834 A | * | 7/1996 | Recalde ................... 405/168.3 |
| 5,692,859 A | * | 12/1997 | Dickson et al. .......... 405/168.4 |
| 5,823,712 A | * | 10/1998 | Kalkman et al. ............ 405/165 |
| 6,189,609 B1 | * | 2/2001 | Shaabon et al. ........ 226/172 X |

FOREIGN PATENT DOCUMENTS

| | | |
|---|---|---|
| GB | 1 250 032 | 10/1971 |
| GB | 2 210 673 | 6/1989 |
| GB | 2 286 647 | 8/1995 |

* cited by examiner

Primary Examiner—Michael R. Mansen
(74) Attorney, Agent, or Firm—Young & Thompson

(57) ABSTRACT

A tensioner, for clamping cables, flexible pipes or bars and moving them forwards in a controlled manner, includes at least two conveyors, each intended to displace one or more clamping members. The conveyors each attached to a main frame element. A selective number of the conveyors can be combined using standard connection elements.

8 Claims, 3 Drawing Sheets

TENSIONER

BACKGROUND OF THE INVENTION

The invention relates to a tensioner, for clamping cables, flexible pipes or bars and moving them forwards in a controlled manner, comprising at least two conveyor means, each intended to displace one or more clamping members, the she of which is adapted to the external shape of the cables, flexible pipes or bars, and the conveyor means each being attached to a main frame element, all this in such a manner that the clamping members can be displaced while clamped around the cables, flexible pipes or bars.

Tensioners are used, inter alia, when laying cables and flexible pipes from a ship, for example on the sea bed. The cables, the flexible pipes or the bars are guided from the ship towards the sea bed using the tensioner, via the so-called S- or J-method. If the S-method is used, the cable or the flexible pipe leaves the ship essentially in the horizontal direction, and the cable or the flexible pipe will be connected to the part which has already been positioned on the sea bed (ground) via an S-bend. If the J-method is used, the cable or the flexible pipe leaves the ship essentially in the vertical direction and is connected to the part which has already been laid on the ground via a J-shaped bend.

The role of the tensioner is twofold. Firstly, the tensioner has to be able to clamp the cable or the flexible pipe fixedly, in order to prevent it leaving the ship at an uncontrolled speed as a result of the weight of the section which is transferred, overboard. The weight which the tensioner has to stop in this way can rise to a very high level. The tensioner therefore has to be able to exert a high clamping force on the cable or the flexible pipe. The second role of the tensioner is to move the cables and the flexible pipes forwards. The maximum speed at which this takes place is dependent, inter alia, on the condition of the ground at that location. Moreover, the cable or the flexible pipe in most cases still has to be assembled on the deck of the ship during laying. The speed at which the assembled pan is moved overboard is therefore dependent on the time which is required for assembling the cable or the flexible pipe itself.

In order to be able to satisfy the demands placed on the tensioners, generally at least two endless conveyors are incorporated in the tensioners according to the prior art. By moving the conveyors towards one another with a considerable force, a high clamping force can be exerted on the cable or flexible pipe positioned between them. By then driving the conveyors, the cable or the flexible pipe can be advanced without losing the clamping force. Since the cables and the flexible pipes have an essentially round cross-section, the conveyors in a tensioner with two conveyors therein are positioned at an angle of 180°. In a tensioner with three conveyors, they form an angle of 120° with respect to one another, and in the case of four conveyors their mutual angle is in each case 90°.

A significant drawback of the tensioners according to the prior art is that the design of a tensioner and the number of conveyors which are fitted therein depends on the typo of cable or flexible pipe for which the tensioner is designed For example, a flexible pipe with, for example, a large diameter and a relatively thin wall may be pressed into an elliptical shape by two conveyors. For this reason, the tensioner for flexible pipes of this nature is generally equipped with three or four conveyors. This means tat the operators of the ships for laying cables and flexible pipes have to purchase a separate tensioner for each type of cable or flexible pipe, a fact which entails relatively high investment costs.

Another significant drawback of the tensioners according to the prior art is, furthermore, that there is generally only one tensioner on board a ship, owing to lack of space. It is therefore impossible to change from one type of tensioner to another type of tensioner while at sea.

A third drawback of the tensioners according to the prior art is that the tensioners are relatively bulky. Owing to the size and weight of the tensioners according to the prior art, they are extremely expensive to transport.

SUMMARY OF THE INVENTION

The object of the present invention is to provide a tensioner which does not exhibit the drawbacks of the tensioners according to the prior art.

In order to achieve his object, the tensioner according to the present invention is provided with conveyor means with clamping members, in which the conveyor means with the clamping members are of modular design, such that various tensioner designs can be constructed with the aid of a number of conveyor means and a number of main frame elements.

The advantage of a tensioner of modular design is firstly the fact that various tensioners can be put together with the aid of a limited number of (at least two) identical conveyor means. The availability of the tensioner which is to be of modular construction means that it is not necessary to purchase a new type of tensioner for each new type of cable or flexible pipe. Instead of a large number of different tensioners, a user only needs to purchase a limited number of these conveyor means. Moreover, the tensioners which are to be of modular construction are of relatively low weight and can be put together in a compact manner.

It is attempted to make the conveyor means with the clamping members of modular design in such a manner that they fit in an ISO container.

By adapting the dimensions of the conveyor means to the size of ISO containers, the conveyor means can be transported in a container or instead of a container. Transporting a tension according to the prior art always requires special precautionary measures and is therefore relatively expensive. By adapting the dimensions of the conveyor means to the dimensions of ISO containers, transporting the tensioner modules according to the present invention does not require any special precautionary measures. The transport costs for a modular tensioner will therefore be much lower than the transport costs for a bulky tensioner according to the prior art.

It is advantageous if the conveyor means comprise attachment eyelets for attaching the conveyor means to a main frame element.

The advantage of this measure is that a tensioner according to the present invention can be put together or altered easily and in a relatively short time.

The tensioner according to the present invention is improved still further if the conveyor means comprise a base frame and a conveyor which is arranged displaceably thereon, the conveyor being attached to the said base frame with the aid of at least one hydraulic cylinder and at least a first and a second pivot arm such that it can move essentially parallel with respect to the said base frame.

Moreover, in this case it is advantageous if the hydraulic cylinder and the pivot arms are all attached both to the base frame and to the conveyor, the attachment position of the hydraulic cylinder on the base frame corresponding to the attachment position of the first pivot arm thereon, and the attachment position of the cylinder on the conveyor corresponding to the attachment position of the second pivot arm thereon.

The advantage of a design of this nature is the only the hydraulic cylinder has to be actuated in order to displace the conveyor with respect to the base frame. In this design, the conveyor is kept parallel along the base frame by means of the pivot arms.

In an advantageous embodiment of the present invention, the conveyor means comprise a conveyor which is provided with a drive chain of double design.

By employing a double chain, the conveyor will be less inclined to start to tilt, since the support provided by the belt is made wider. In a manner of speaking, the "wheel base" of the belt becomes wider as a result of a double chain being used. This measure improves the stability of the tensioner according to the present invention considerably by comparison with tensioners according to the prior art.

The present invention relates not only to a tensioner but also to a conveyor means of modular design which is intended for the tensioner according to the present invention. It is advantageous here for at least two conveyor means according to the present invention to be connected to one another by means of main frame elements, in which case preferably a limited number of variants of the said main frame elements are sufficient for constructing a tensioner having 2, 3, 4 or more conveyor means, as desired. This has the advantage that a tensioner which is suitable for any type of cable or flexible pipe can be constructed using a limited number of means together with a limited number of frame elements. Furthermore, this offers the possibility of very compact design.

BRIEF DESCRIPTION OF THE DRAWINGS

The construction and use of the present invention will be explained with reference to the following drawings, in which.

DESCRIPTION OF THE PREFERRED EMBODIMENTS

Figure 1:
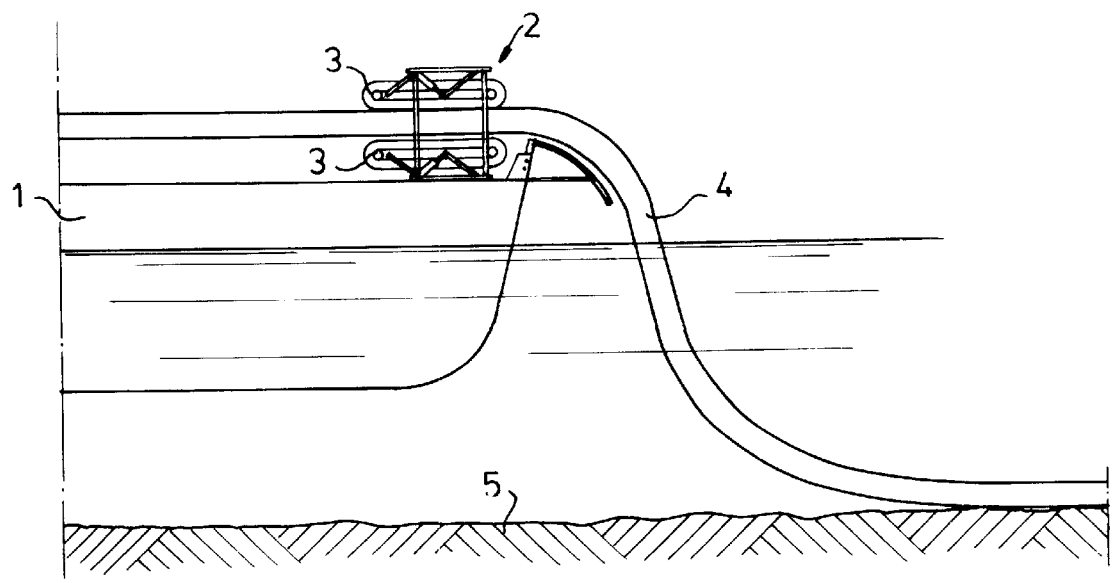
FIG. 1 diagrammatically depicts how a cable or a flexible pipe is moved overboard via the S-method.

FIG. 1 diagrammatically depicts the case in which a tensioner 2 which is positioned on a ship 1 is used to lay a cable or a flexible pipe 4 on the bed 5 of, for example, the sea via the so-called S-method. It can be seen in FIG. 1 that the cable or the flexible pipe 4 leaves the ship 1 essentially in the horizontal direction, That part of the cable or flexible pipe 4 which is clamped fixedly by means of the tensioner 2 is connected via an S-bend to the part which has already been laid on the bed 5.

Figure 2:
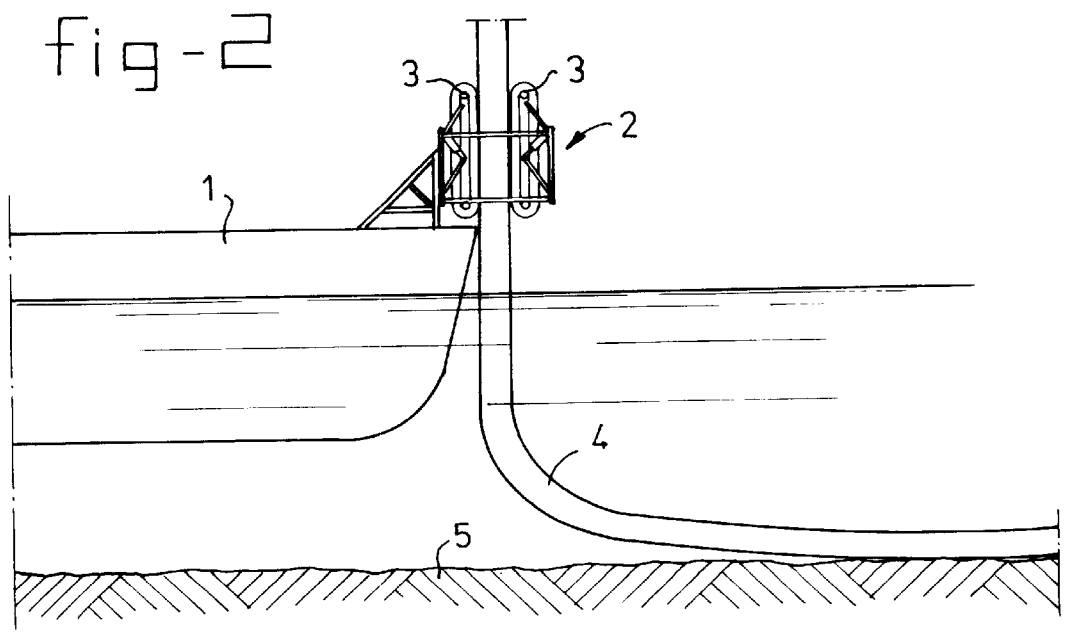
FIG. 2 diagrammatically depicts how a cable or a flexible pipe is moved overboard via the J-method.

FIG. 2 diagrammatically depicts the case in which a cable or a flexible pipe 4 is laid on the bed 5 of, for example, the sea from a ship 1, with the aid of a tensioner 2, via the so-called J-method. It can be seen in the figure that the cable or flexible pipe 4 leaves the ship 1 essentially in the vertical direction. That part of the cable or the flexible pipe 4 which is clamped fixedly by means of the tensioner 2 is connected in a J-shaped bend to the part which has already been placed on the bed 5.

It can be seen from FIGS. 1 and 2 that the tensioner 2 has two functions. Firstly, the tensioner 2 has to prevent the cable or the flexible pipe 4 from leaving the ship 1 of its own accord as a result of its own weight. For this reason, the tensioner 2 has to be able to clamp the cable or the flexible pipe 4 fixedly. Secondly, the tensioner 2 has to be able to move the cable or flexible pipe 4 overboard without losing this clamping force. The tensioner 2 is therefore provided with at least two conveyor means 3, comprising conveyors. The conveyors can be moved towards one another in order to clamp a cable or flexible pipe 4 fixedly. By moreover driving the conveyors, the cable or flexible pipe 4 can leave the ship 1 at a controlled speed.

Figure 3:
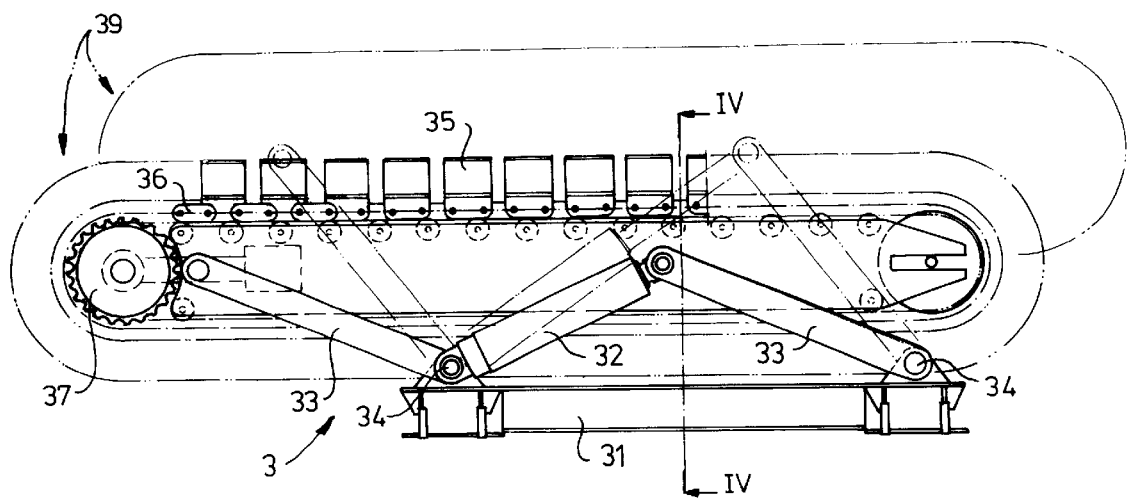
FIG. 3 is a side view of the conveyor means according to the present invention.

FIG. 3 shows the conveyor means according to the present invention, The conveyor means 3 comprise a base frame 31 and a conveyor 39 which is arranged movably with respect to this base frame 31. The conveyor 39 is attached, for example, to the base frame 31 with the aid of at least one hydraulic cylinder 32 and two pivot arms 33. The hydraulic cylinder 32 and the pivot arms 33 are preferably attached to the base frame 31 via attachment eyelets 34. For its part, the conveyor 39 comprises, inter alia, clamping members 35 which can be pushed onto a cable or flexible pipe 4 which is to be displaced. The clamping members 35 are positioned on a chain 36. This chain 36 is preferably of double design, in order to be able to support the clamping members 35 over their width (cf. FIG. 4). The chain 36 of the conveyor is advanced, for example, with the aid of a toothed wheel 37. Moreover, the base frame 31 is provided with attachment eyelets 38, by means of which the conveyor means 3 can be connected in a simple manner to, for example, a main frame.

Figure 4:
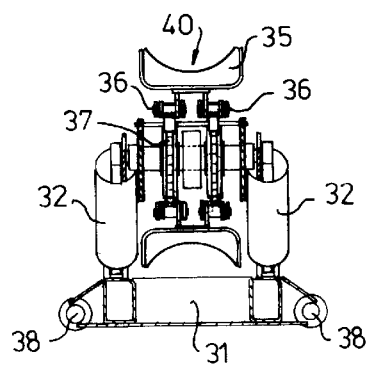
FIG. 4 is a cross-section on line IV—IV of the conveyor means in accordance with FIG. 3.

FIG. 4 shows a cross-section of the conveyor means 3 on line IV—IV, in accordance with FIG. 3. The double chain 36 ensures that the clamping members 35 cannot tilt with respect to the base frame 31, not even if these members 35 are subjected to relatively high compressive forces. It is advantageous if the clamping members 35 have an essentially annular or V-shaped recess 40 on their outwardly directed surface. As a result the overall circumference which the clamping members 35 of conveyors 39 placed in a tensioner (cf. FIGS. 5 and 6) delimit will also be annular.

Figure 5:
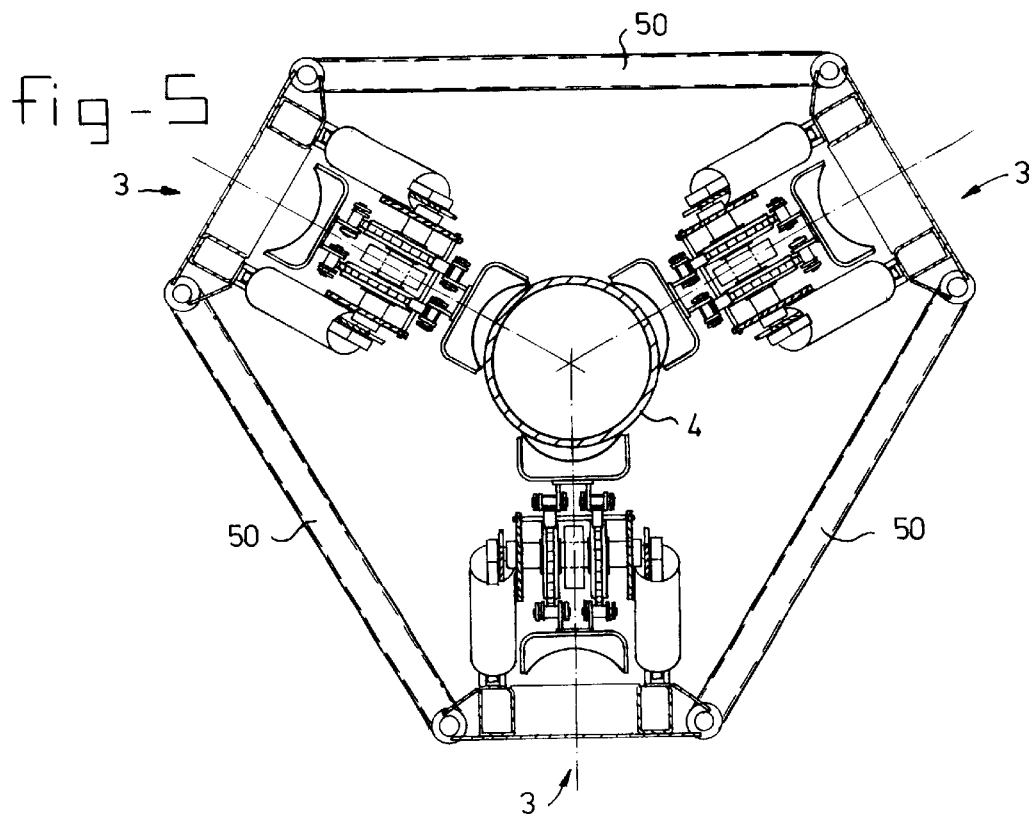
FIG. 5 is a cross-section of a tensioner with three conveyor means according to the present invention therein.

FIG. 5 shows a tensioner which is composed of three conveyor means 3 according to the present invention. The modules 3 are attached to one another with the aid of main frame elements 50. It can be seen in the figure that the main frame elements 50 are connected to the conveyor means 3 via the attachment eyelets 38.

Figure 6:
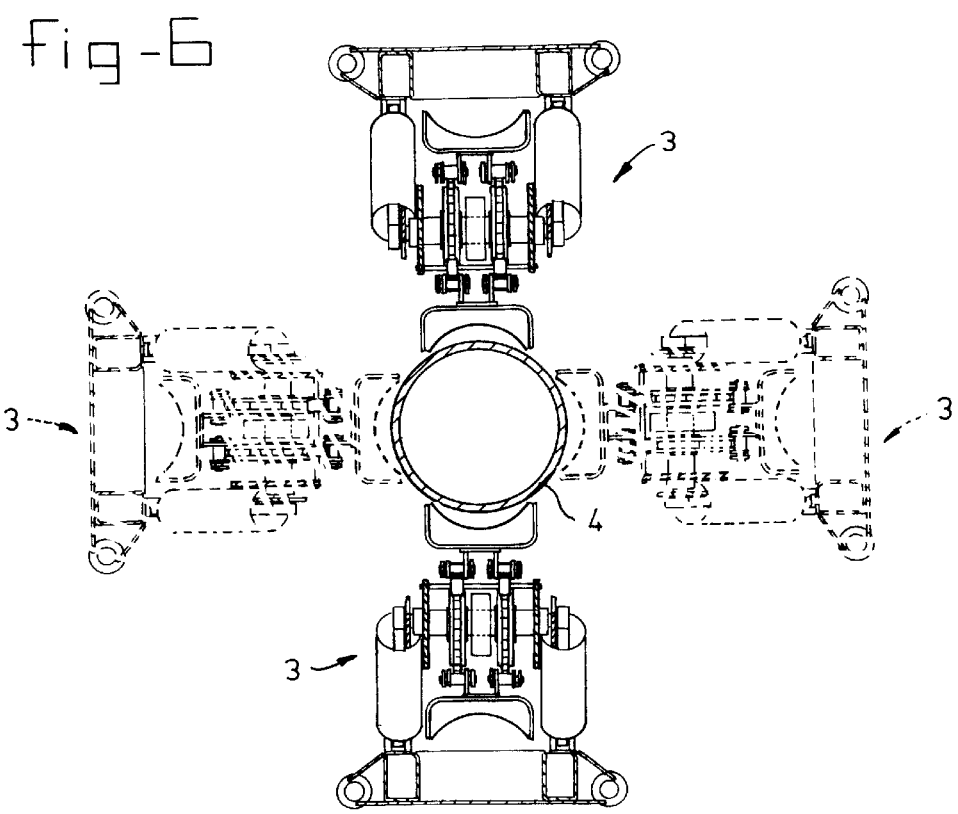
FIG. 6 is a cross-section of a tensioner with two or four conveyor means according to the present invention therein.

FIG. 6 shows the situation where a cable or a flexible pipe 4 is sounded by two or four (shown in dashed lines) conveyor means 3 according to the invention.

It can be seen from FIGS. 5 and 6 that it is possible, as desired, to assemble two, three, four or, if desired, even more conveyor means 3 according to the present invention to form one tensioner. The number of conveyor means 3 to be used will depend on, inter alia, the thickness, the stiffness and the weight of the cable or flexible pipe to be displaced. The advantage of this is that it is not necessary to build a special tensioner for each type of cable or flexible pipe. Various different tensioners can be constructed using a limited number of conveyor means 3 according to the present invention and a number of standard main frame elements 50.

What is claimed is:

1. A tensioner assembly comprising:

plural separate conveyors and plural connection elements that connect said conveyors together in plural different connection arrangements wherein a tensioner formed by the tensioner assembly includes a selectable number of said conveyors;

each of said conveyors comprising plural clamping members that are arranged to engage a body to be conveyed, an endless chain carrying said plural clamping members, a base frame that adjustably carries said endless chain, and attachment points in said base frame; and each of said connection elements comprising connectors at ends thereof for connection to respective ones of said attachment points to create the plural different connection arrangements.

2. The tensioner assembly of claim 1, wherein said connection elements are rods with a common length.

3. The tensioner assembly of claim 1, wherein for each of said conveyors a position of said endless chain relative to a body to be conveyed is adjustable independent of a position of another said endless chain.

4. The tensioner assembly of claim 3, wherein each of said conveyors comprises hydraulic cylinders attached to said base frame that adjust a distance of said endless chain from said base frame.

5. The tensioner assembly of claim 1, wherein each said endless chain is a double chain.

6. The tensioner assembly of claim 1, including four of said conveyors.

7. Then tensioner assembly of claim 6, wherein said attachment points are eyelets, each of said conveyors comprises hydraulic cylinders attached to said base frame that adjust a distance of said endless chain from said base frame, and each said endless chain is a double chain.

8. The tensioner assembly of claim 1, wherein all four of said conveyors are connected by said connection elements to form a tensioner with four conveyors at 90° intervals.

* * * * *